US010497491B2

(12) United States Patent
Ryu et al.

(10) Patent No.: US 10,497,491 B2
(45) Date of Patent: Dec. 3, 2019

(54) HALOGEN-FREE FLAME-RETARDANT POLYOLEFIN INSULATION COMPOSITION AND CABLE HAVING AN INSULATING LAYER FORMED FROM THE SAME

(71) Applicant: LS CABLE & SYSTEM LTD., Anyang-si, Gyeonggi-do (KR)

(72) Inventors: Ik-Hyun Ryu, Anyang-si (KR); Jae-Ik Lee, Seoul (KR); Won-Suck Lee, Gunpo-si (KR); Ji-Wook Shin, Uiwang-si (KR); Tae-Hyun Lee, Bucheon-si (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 22 days.

(21) Appl. No.: 15/560,329

(22) PCT Filed: Jun. 26, 2017

(86) PCT No.: PCT/KR2017/006686
§ 371 (c)(1),
(2) Date: Sep. 21, 2017

(87) PCT Pub. No.: WO2018/182094
PCT Pub. Date: Oct. 4, 2018

(65) Prior Publication Data
US 2018/0286535 A1    Oct. 4, 2018

(30) Foreign Application Priority Data

Mar. 30, 2017  (KR) .................. 10-2017-0041085
Jun. 19, 2017   (KR) .................. 10-2017-0077521

(51) Int. Cl.
*H01B 7/295* (2006.01)
*C08L 57/00* (2006.01)
*H01B 7/02* (2006.01)
*H01B 3/30* (2006.01)
*H01B 3/42* (2006.01)

(52) U.S. Cl.
CPC ............ *H01B 7/295* (2013.01); *C08L 57/00* (2013.01); *H01B 3/307* (2013.01); *H01B 3/427* (2013.01); *C08L 2201/02* (2013.01); *C08L 2203/202* (2013.01); *H01B 7/0216* (2013.01)

(58) Field of Classification Search
CPC ............... H01B 3/441; C08L 2203/20; C08L 2203/202
See application file for complete search history.

(56) References Cited

U.S. PATENT DOCUMENTS

| 4,814,130 A | * | 3/1989 | Shiromatsu | ........... C08F 255/00 264/83 |
| 5,002,996 A | * | 3/1991 | Okuda | ............... C08F 255/00 524/436 |
| 6,392,153 B1 | * | 5/2002 | Horwatt | .............. H01B 7/295 174/110 R |
| 6,646,205 B2 | * | 11/2003 | Hase | ................. C08K 3/22 174/110 R |
| 2008/0227887 A1 | * | 9/2008 | Klier | .................. H01B 3/28 523/173 |
| 2011/0240335 A1 | * | 10/2011 | Grizante Redondo ..................... C08L 23/04 174/116 |
| 2013/0025910 A1 | * | 1/2013 | Englund | ............... C08K 5/07 174/120 SC |
| 2013/0048338 A1 | * | 2/2013 | Suzuki | .................. C08J 3/24 174/120 R |
| 2014/0030520 A1 | * | 1/2014 | Nakamura | ........... H01B 3/308 428/368 |
| 2014/0367144 A1 | * | 12/2014 | Segawa | .............. H01B 3/441 174/113 R |
| 2016/0260524 A1 | * | 9/2016 | Clancy | ................... C08K 3/22 |

FOREIGN PATENT DOCUMENTS

| JP | 2012500460 A | 1/2012 |
| JP | 2015-130348 A | 7/2015 |
| KR | 10-2010-0005502 A | 1/2010 |
| KR | 10-2011-0042239 A | 4/2011 |
| KR | 10-1314010 B1 | 10/2013 |
| KR | 10-1353259 B1 | 2/2014 |
| KR | 10-2015-0093586 A | 8/2015 |
| KR | 10-1560997 B1 | 10/2015 |

OTHER PUBLICATIONS

Cabrera-Alvarez, et al."Study of the Silane Modification of Magnesium Hydroxide and Their Effects on the Flame Retardant and Tensile Properties of High Density Polyethylene Nanocomposites", Polymer Composites, 35 (6), p. 1060-1069, Jun. 2014 first published Oct. 31, 2013. (Year: 2013).*
Zinc Stearate Techncial data sheet, Arkochem Downloaded Dec. 13, 2018. (Year: 2018).*
KR101314010 Espacenet English Machine Translation, prepared Jan. 6, 2019 (Year: 2019).*
Sep. 11, 2017, Korean Office Action for related KR application No. 10-2017-0041085.
Korean Office Action for related KR Application No. 10-2017-0077521 dated Dec. 16, 2017 from Korea Patent Office.
International Search Report for PCT/KR2017/006686 dated Feb. 19, 2018 from Korean Intellectual Property Office.

* cited by examiner

*Primary Examiner* — Christopher M Rodd
(74) *Attorney, Agent, or Firm* — K&L Gates LLP

(57) ABSTRACT

A halogen-free flame-retardant insulation composition including: halogen-free resin serving as base resin; and a flame-retardant agent. The halogen-free resin includes: first polyolefin resin having a melting point of 90 to 170° C.; and second polyolefin resin having a melting point of 50 to 80° C. Content of the flame-retardant agent is 100 to 200 parts by weight with respect to 100 parts by weight of the base resin, and an insulating sample formed of the insulation composition has an elongation rate of 125% or more.

14 Claims, 4 Drawing Sheets

HALOGEN-FREE FLAME-RETARDANT POLYOLEFIN INSULATION COMPOSITION AND CABLE HAVING AN INSULATING LAYER FORMED FROM THE SAME

CROSS REFERENCE TO PRIOR APPLICATIONS

This application is a National Stage Patent Application of PCT International Patent Application No. PCT/KR2017/006686 filed on Jun. 26, 2017 under 35 U.S.C. § 371, which claims priority to Korean Patent Application Nos. 10-2017-0041085 filed on Mar. 30, 2017 and 10-2017-0077521 filed on Jun. 19, 2017, which are all hereby incorporated by reference in their entirety.

BACKGROUND

The present invention relates to a halogen-free flame-retardant polyolefin insulation composition and a cable having an insulation layer formed of the same. More particularly, the present invention relates to a halogen-free flame-retardant polyolefin insulation composition which is eco-friendly, can reduce manufacturing costs, has high installation performance and high flame resistance, satisfies properties such as heat resistance, water resistance, an insulating property, cold resistance, etc., and can provide a cable having a high-elongation insulation layer and being thus prevented from cracking or being damaged when bent excessively during installation of the cable, and a cable having an insulation layer formed of the same.

In a cable used for wiring or interior wiring in a general electrical structure or electrical equipment, an insulator is required to have properties such as high heat resistance, flame resistance, water resistance, chemical resistance, an insulating property, cold resistance, and oil resistance in case of fire, flooding, etc.

When a cable for interior wiring for electric light, electrical heating, etc. is installed not to be exposed, the cable is installed by inserting the cable into a specific location, such as a ceiling, a wall, or a floor, and pulling out it from a location spaced a certain distance from the specific location. Here, the cable inserted into the ceiling, the wall, or the floor is transferred using a conduit tube protecting the cable and guiding the cable until the cable is pulled out, e.g., a conduit tube formed of a material such as polyvinyl chloride (PVC).

It may be difficult to transfer the cable using the conduit tube when the cable is excessively flexible or stiff or when the cable is rubbed against an inner wall of the conduit tube or another cable inserted together with the cable. In particular, it may be very difficult to transfer the cable when it is transferred using the conduit tube in a curved region of the ceiling, wall, or floor of a building or facility.

Thus, the cable should have flexibility and stiffness appropriate for the transfer thereof, and a surface friction coefficient of an insulation layer of the cable should be low enough to minimize friction between the cable and either the inner wall of the conduit tube or another cable transferred together with the cable so as to improve the installation performance of the cable. To improve the installation performance of the cable, an installation work may be performed after applying lubricating oil or the like on a surface of the cable. In this case, the oil resistance of the insulation layer of the cable against the lubricating oil should be improved.

A conventional heat-resistant PVC insulation wire used for interior wiring is a wire insulated with PVC resin to which a heat-resistant plasticizer is added. The PVC resin has high heat resistance, high flame resistance, high chemical resistance, high water resistance, and high installation performance but a maximum allowable temperature thereof is relatively low and the PVC resin is harmful to a human body and may cause environmental problems to occur, e.g., it generates toxic gas when it burns. Thus, use of the conventional heat-resistant PVC insulation wire has recently been regulated.

A halogen-free flame-retardant polyolefin insulation cable has been developed and used in place of the conventional heat-resistant PVC insulation wire having the above problems. The halogen-free flame-retardant polyolefin insulation cable is a wire insulated with flame-retardant agent-added halogen-free insulating resin and is eco-friendly since it uses halogen-free insulating resin.

However, even if a flame-retardant agent is added to the halogen-free flame-retardant polyolefin insulation cable to secure flame resistance corresponding to that of conventional PVC resin, the flame resistance of the halogen-free flame-retardant polyolefin insulation cable is insufficient and a surface friction coefficient of an insulation layer thereof is increased due to the added flame-retardant agent. Thus, the installation performance of the halogen-free flame-retardant polyolefin insulation cable is very low. Furthermore, a wire for interior wiring should have a specific color to be differentiated from a cable adjacent thereto. To this end, a certain amount of pigment is added to the insulation layer but the physical properties such as flame resistance of the cable may deteriorate due to the addition of the pigment.

When a large amount of the flame-retardant agent is added to halogen-free polyolefin resin to secure flame resistance corresponding to that of the conventional PVC resin, an elongation rate of the halogen-free flame-retardant polyolefin insulation cable decreases to a large extent. Thus an insulation layer of the cable may have cracks on a surface thereof or be damaged when the cable is excessively bent during installation of the cable.

Furthermore, the halogen-free flame-retardant polyolefin insulation cable is more expensive than the conventional heat-resistant PVC insulation wire. A filler such as an inorganic filler may be added to the insulation layer to reduce manufacturing costs. However, when the inorganic filler is added, the viscosity of an insulation composition increases and thus the content of the flame-retardant agent which is also an inorganic additive should be decreased to secure the extrusion performance of the insulation layer formed of the insulation composition and the yield thereof. Thus, flame resistance may greatly decrease.

If a large amount of an inorganic additive such as the inorganic filler or the flame-retardant agent is added, the additive added into the insulation layer may decompose due to extrusion load when the insulation layer is extruded and thus bubbles may be generated, thereby greatly deteriorating the physical properties of the insulation layer.

Accordingly, there is an urgent need for a halogen-free flame-retardant polyolefin insulation composition which is eco-friendly, can reduce manufacturing costs, has high installation performance and high flame resistance, satisfies properties such as heat resistance, water resistance, an insulating property, cold resistance, etc., and can provide a cable having a high-elongation rate insulation layer and thus being prevented from cracking or being damaged when bent excessively during installation of the cable, and a cable having an insulation layer formed of the same.

SUMMARY

The present invention is directed to a halogen-free flame-retardant polyolefin insulation cable which is eco-friendly and reduces manufacturing costs.

The present invention is also directed to a halogen-free flame-retardant polyolefin insulation cable having high installation performance and high flame resistance.

The present invention is also directed to a halogen-free flame-retardant polyolefin insulation cable satisfying all properties such as heat resistance, water resistance, an insulating property, cold resistance, oil resistance, etc.

The present invention is also directed to a halogen-free flame-retardant polyolefin insulation cable having a high-elongation rate insulation layer which may be prevented from cracking or being damaged even when the cable is excessively bent during installation of the cable.

According to an aspect of the present invention, a halogen-free flame-retardant insulation composition comprises halogen-free resin serving as base resin; and a flame-retardant agent, wherein the halogen-free resin comprises: first polyolefin resin having a melting point of 90 to 170° C.; and second polyolefin resin having a melting point of 50 to 80° C., content of the flame-retardant agent is 100 to 200 parts by weight with respect to 100 parts by weight of the base resin, and an insulating sample formed of the insulation composition has an elongation rate of 125% or more.

According to an another of the present invention, the halogen-free flame-retardant insulation composition further comprises: a flame-retardant supplement; and an inorganic filler.

According to another aspect of the present invention, the flame-retardant supplement comprises melamine cyanurate, and the inorganic filler comprises calcium carbonate ($CaCO_3$).

According to another aspect of the present invention, content of the flame-retardant supplement is 10 to 50 parts by weight with respect to 100 parts by weight of the base resin, and content of the inorganic filler is 10 to 50 parts by weight with respect to 100 parts by weight of the base resin.

According to another aspect of the present invention, total content of inorganic additives including the flame-retardant agent and the inorganic filler is 110 to 230 parts by weight with respect to 100 parts by weight of the base resin.

According to another aspect of the present invention, an amount of the flame-retardant agent is three to six times greater than that of the inorganic filler.

According to another aspect of the present invention, the second polyolefin resin has a melting point of 50 to 65° C.

According to another aspect of the present invention, a difference between the melting points of the first polyolefin resin and the second polyolefin resin is 20° C. or more.

According to another aspect of the present invention, the insulating sample formed of the insulation composition has an elongation rate of 125% to 250%.

According to another aspect of the present invention, a heat distortion rate of a tubular insulating sample formed of the insulation composition and having a length of 70 mm is measured to be 50% or less according to a standard KS C 60811-2-1, the heat distortion rate being a rate of increase in the length of the tubular insulation sample, measured by attaching a weight having a certain weight to the tubular insulating sample in an oven of 200° C. and measuring the rate of increase in the length of the sample after fifteen minutes.

According to another aspect of the present invention, the first polyolefin resin comprises low-density polyethylene resin, and the second polyolefin resin comprises polyolefin elastomer.

According to another aspect of the present invention, a mixing ratio of the first polyolefin resin and the second polyolefin resin is 2:8 or 6:4.

According to another aspect of the present invention, the halogen-free resin further comprises modified polyolefin resin.

According to another aspect of the present invention, the modified polyolefin resin comprises modified linear low-density polyethylene resin (LLDPE) of 5 to 20 parts by weight with respect to 100 parts by weight of the base resin.

According to another aspect of the present invention, the modified linear low-density polyethylene resin (LLDPE) comprises linear low-density polyethylene resin (MA-g-LLDPE) grafted with maleic anhydride.

According to another aspect of the present invention, the halogen-free flame-retardant insulation composition further comprises internal lubricant of 1 to 10 parts by weight with respect to 100 parts by weight of the base resin.

According to another aspect of the present invention, the internal lubricant comprises polyethylene-based wax of 1 to 4 parts by weight with respect to 100 parts by weight of the base resin.

According to another aspect of the present invention, the flame-retardant agent comprises magnesium hydroxide ($Mg(OH)_2$) or aluminum hydroxide ($Al(OH)_3$) which is surface-treated with at least one type of a surface modifier selected from a group consisting of vinylsilane, metacrylic silane, stearic acid, oleic acid, aminopolysiloxane, and a titanate-based coupling agent.

According to another aspect of the present invention, the halogen-free flame-retardant insulation composition further comprises at least one type of a silane-based cross-linking agent of 2.0 to 5.0 parts by weight with respect to 100 parts by weight of the base resin, the at least one type of the silane-based cross-linking agent being selected from a group consisting of vinyl trimethoxy silane, 3-(trimethoxysilyl)-propylmethacrylate, vinyltriethoxysilane, and vinyl trimethoxyethoxy silane.

According to another aspect of the present invention, a halogen-free flame-retardant insulation cable comprises: a conductor; and an insulation layer covering the conductor, and formed of the halogen-free flame-retardant insulation composition.

According to another aspect of the present invention, the insulation layer comprises external lubricant provided in a region having a thickness of 30 to 500 μm on a surface of the insulation layer.

According to another aspect of the present invention, the halogen-free flame-retardant insulation composition further comprises: a flame-retardant supplement; and an inorganic filler.

According to another aspect of the present invention, the flame-retardant supplement comprises melamine cyanurate, and the inorganic filler comprises calcium carbonate ($CaCO_3$).

According to another aspect of the present invention, content of the flame-retardant supplement is 10 to 50 parts by weight with respect to 100 parts by weight of base resin of the insulation composition, and content of the inorganic filler is 10 to 50 parts by weight with respect to 100 parts by weight of the base resin.

According to another aspect of the present invention, total content of inorganic additives including the flame-retardant agent and the inorganic filler is 110 to 230 parts by weight with respect to 100 parts by weight of base resin of the insulation composition.

According to another aspect of the present invention, an amount of the flame-retardant agent is three to six times greater than that of the inorganic filler.

According to another aspect of the present invention, halogen-free resin of the insulation composition further comprises modified polyolefin resin.

According to another aspect of the present invention, modified polyolefin resin comprises modified linear low-density polyethylene resin (LLDPE) of 5 to 20 parts by weight with respect to 100 parts by weight of base resin of the insulation composition.

According to another aspect of the present invention, the modified linear low-density polyethylene resin (LLDPE) comprises linear low-density polyethylene resin (MA-g-LLDPE) grafted with maleic anhydride.

According to another aspect of the present invention, the halogen-free flame-retardant insulation cable further comprises an outer insulation layer covering the insulation layer, wherein the outer insulation layer is formed of the halogen-free flame-retardant insulation composition of claim 1.

According to another aspect of the present invention, the outer insulation layer has a thickness of 30 to 500 μm, and comprises external lubricant.

According to another aspect of the present invention, first polyolefin resin of the insulation composition comprises low-density polyethylene resin, and second polyolefin resin of the insulation composition comprises polyolefin elastomer.

According to another aspect of the present invention, a mixing ratio of the first polyolefin resin and the second polyolefin resin is 2:8 or 6:4.

According to another aspect of the present invention, a gel fraction is in a range of 50 to 95% after halogen-free resin of the insulation composition is cross-linked.

According to another aspect of the present invention, the external lubricant comprises at least one type of lubricant selected from a group consisting of fatty acid, fatty acid salt, fatty acid amide, silicon-based lubricant, and wax, wherein content of the lubricant is 1 to 10 parts by weight with respect to 100 parts by weight of base resin of the insulation composition.

According to another aspect of the present invention, the halogen-free flame-retardant insulation cable further comprises pigment of 1 to 10 parts by weight with respect to 100 parts by weight of base resin of an insulation composition in a region having a thickness of 30 to 500 μm on a surface of the insulation layer or the outer insulation layer, the insulation composition being used to form the insulation layer or the outer insulation layer.

According to another aspect of the present invention, the conductor has an elastic coefficient of 15,000 to 21,000 MPa.

According to another aspect of the present invention, the flame-retardant agent comprises magnesium hydroxide (Mg(OH)$_2$) or aluminum hydroxide (Al(OH)$_3$) which is surface-treated with at least one type of a surface modifier selected from the group consisting of vinylsilane, metacrylic silane, stearic acid, oleic acid, aminopolysiloxane, and a titanate-based coupling agent.

According to another aspect of the present invention, an insulation composition for forming the insulation layer or an insulation composition for forming the outer insulation layer comprises nanoclay of 1 to 10 parts by weight with respect to 100 parts by weight of base resin of the insulation composition, the nanoclay serving as a flame-retardant supplement.

According to another aspect of the present invention, an insulation composition for forming the insulation layer or an insulation composition for forming the outer insulation layer comprises at least one type of a silane-based cross-linking agent of 2.0 to 5.0 parts by weight with respect to 100 parts by weight of base resin of the insulation composition, the at least one type of the silane-based cross-linking agent selected from the group consisting of vinyl trimethoxy silane, 3-(trimethoxysilyl)-propylmethacrylate, vinyl triethoxy silane, and vinyl trimethoxyethoxy silane.

According to another aspect of the present invention, an insulation composition for forming the insulation layer or an insulation composition for forming the outer insulation layer comprises, as a cross-linking initiator, dicumyl peroxide of 0.4 to 5 parts by weight with respect to 100 parts by weight of base resin of the insulation composition.

According to another aspect of the present invention, an insulation composition for forming the insulation layer or an insulation composition for forming the outer insulation layer further comprises at least one type of a condensed catalyst of 0.5 to 5 parts by weight with respect to 100 parts by weight of base resin of the insulation composition, the at least one type of condensed catalyst being selected from the group consisting of metal carboxylate, an organic metal compound, an organic base, and acid, wherein the metal carboxylate comprises dibutyl tin dilaurate, tin octoate, tin acetate, lead naphthenate, or zinc octoate, the organic metal compound comprises titanium ester and chelate or tetrabutyl titanate, the organic base comprises ethylamine, hexylamine, or piperidine, and the acid comprises mineral acid or fatty acid.

According to another aspect of the present invention, an insulation composition for forming the insulation layer or an insulation composition for forming the outer insulation layer further comprises at least one type of an additive selected from the group consisting of antioxidant, internal lubricant, processing stabilizer, a heavy-metal deactivator, a blowing agent, and multifunctional monomer.

According to another aspect of the present invention, the insulation layer or the outer insulation layer comprises at least one protrusion.

A halogen-free flame-retardant polyolefin insulation cable according to the present invention is eco-friendly since it has an insulation sheath formed of halogen-free resin and may thus prevent the occurrence of environmental problems caused when halogen-based resin is used, and may reduce manufacturing costs by securing the extrusion performance of an insulation layer and the yield thereof by simplifying a manufacturing process through precise control of the type and content of a cross-linking agent and improving compatibility between base resin and inorganic additives such as an inorganic flame-retardant agent and an inorganic filler through precise control of the content of the inorganic additives and through specific design of the base resin.

The halogen-free flame-retardant polyolefin insulation cable according to the present invention exhibits an effect of improving both installation performance and flame resistance which are in a trade-off relation with each other through keeping a balance between a conductor and the insulation layer in terms of flexibility and stiffness and through precise control of a surface friction coefficient of the insulation layer.

The halogen-free flame-retardant polyolefin insulation cable according to the present invention exhibits an effect of satisfying all properties of the cable, e.g., heat resistance, water resistance, an insulating property, cold resistance, oil resistance, etc., by minimizing the amount of pigment, external lubricant, etc. to be added.

Furthermore, the halogen-free flame-retardant polyolefin insulation cable according to the present invention exhibits an effect of preventing the insulation layer from cracking or being damaged when the cable is excessively bent during installation of the cable by maximizing an elongation rate through precise control of a melting point and content of base resin included in the insulation layer even when a large amount of a flame-retardant agent is added.

DETAILED DESCRIPTION

Figure 1A:
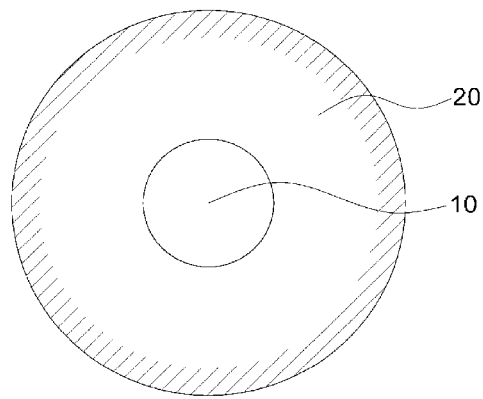
FIGS. 1A-1C are schematic cross-sectional views of halogen-free flame-retardant polyolefin insulation cables according to embodiments of the present invention.

Hereinafter, exemplary embodiments of the present invention will be described in detail with reference to the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those of ordinary skill in the art. The same reference numerals represent the same elements throughout the drawings.

Figure 1B:
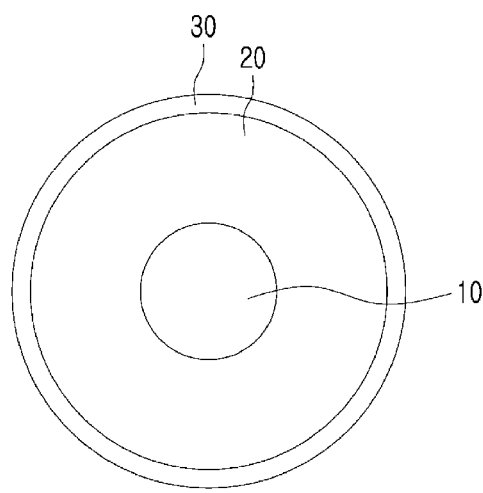
Figure 1C:
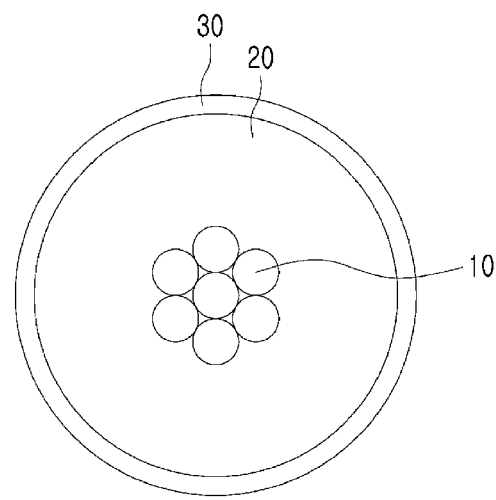

FIGS. 1A-1C are schematic cross-sectional views of halogen-free flame-retardant polyolefin insulation cables according to embodiments of the present invention. As illustrated in FIG. 1A, a halogen-free flame-retardant polyolefin insulation cable according to the present invention may include a conductor 10 and an insulation layer 20 covering the conductor 10. Alternatively, as illustrated in FIG. 1B, a halogen-free flame-retardant polyolefin insulation cable according to the present invention may further include an additional insulation layer 30 on an outer surface of an insulation layer 20. Thus, the insulation layer 20 may be referred to as an inner insulation layer and the insulation layer 30 may be referred to as an outer insulation layer.

The conductor 10 may be formed of a conductive metal such as copper or aluminum, and preferably, copper. The conductor 10 may be a single wire as illustrated in FIG. 1A or 1B or may be twisted wires obtained by twisting a plurality of wires, e.g., seven or nineteen wires, as illustrated in FIG. 1C. In the case of a halogen-free flame-retardant polyolefin insulation cable used for interior wiring or the like, the conductor 10 preferably includes twisted wires rather than a single wire, in terms of flexibility.

A diameter of the conductor 10 may be determined according to a rated voltage of the halogen-free flame-retardant polyolefin insulation cable. For example, when the conductor 10 for use in a halogen-free flame-retardant polyolefin insulation cable used for interior wiring and having a rated voltage of 450/750 V is a single wire, the conductor 10 may have a nominal cross-sectional area of about 1.5 to 10 $mm^2$. When the conductor 10 includes twisted seven element wires, each of the element wires may have a diameter of about 0.53 to 1.35 mm and the conductor 10 may have a nominal cross-sectional area of 1.5 to 300 SQ, and particularly, 1.5 to 4 SQ.

When the halogen-free flame-retardant polyolefin insulation cable according to the present invention is used for interior wiring for electric light, electrical heating, etc., the cable may be installed not to be exposed by inserting the cable into a specific location, such as a ceiling, a wall, or a floor, and pulling out it from a location spaced a certain distance from the specific location. Here, the cable inserted into the ceiling, the wall, or the floor is transferred using a conduit tube protecting the cable and guiding the cable until the cable is pulled out, e.g., a conduit tube formed of a material such as PVC.

The cable transferred using the conduit tube may be difficult to be transferred when it is excessively flexible or stiff or when the cable is rubbed against an inner wall of the conduit tube or another cable inserted together with the cable. In particular, the cable may be very difficult to be transferred when it is transferred using the conduit tube in a curved region of the ceiling, wall, or floor of a building or facility.

Thus, when the halogen-free flame-retardant polyolefin insulation cable according to the present invention is used for interior wiring, a balance between flexibility and stiffness is required to be precisely controlled to secure high installation performance. The flexibility and stiffness of the halogen-free flame-retardant polyolefin insulation cable are determined by the elasticity thereof.

Here, the elasticity of the halogen-free flame-retardant polyolefin insulation cable may be determined by elastic coefficients of the conductor 10 and the insulation layers 20 and 30 of the halogen-free flame-retardant polyolefin insulation cable. Here, the elastic coefficient of the conductor 10 may be about 15,000 to 21,000 MPa, and preferably, 17,000 to 18,000 MPa to increase the installation performance of the cable.

The insulation layer 20 may be formed by extruding an insulation composition. The present invention relates to an insulation composition for forming the insulation layer 20, i.e., a halogen-free flame-retardant polyolefin insulation composition. The insulation composition may include electrically insulating polymer resin as base resin and a flame-retardant agent to achieve flame resistance of the cable.

The electrically insulating polymer resin may include two or more types of resin having different melting points Tm to improve both desired installation performance of the insulation cable having the insulation layer 20 including the electrically insulating polymer resin and flame resistance which is in trade-off relation with the installation performance and to satisfy properties such as heat resistance, water resistance, an insulating property, cold resistance, oil resistance, etc.

In particular, when two or more types of resin having different melting points Tm are mixed and applied as the base resin, compatibility of the resin with a filler added thereto, and particularly, the flame-retardant agent, i.e., the dispensability of the filler with respect to the resin, may be greatly improved. Thus, even if a large amount of the flame-retardant agent is added to achieve high flame resistance, the elongation rate of the insulation layer 20 may be maximized. Accordingly, even when the cable is excessively bent during installation of the cable, the insulation layer 20 may be prevented from having surface cracks or being damaged.

Furthermore, when used as the base resin, low melting point resin having a relatively low melting point Tm may further decrease extrusion load during extruding of the insulation layer 20, and may compensate for an increase in the viscosity of the insulation composition when the inorganic filler such as the flame-retardant agent is added and an increase in the extrusion load due to the increase in the viscosity of the insulation composition when the insulation layer 20 is extruded.

An elongation rate of the insulation layer 20 may be measured according to the standard KS C 60811-1-1. In detail, if the conductor 10 is removed from the cable and a tensile force is applied to a tubular sample having a length of about 100 mm at a tension speed of 250 mm/min and at 23±5° C., the elongation rate of the insulation layer 20 may be measured by calculating a rate of increase in the length of the tubular sample when the tubular sample fractures.

Here, the elongation rate of the insulation layer 20 may be 125% or more, and may be, for example, in a range of 125 to 250%. If the elongation rate of the insulation layer 20 is less than 125%, the insulation layer 20 may have surface cracks or be damaged when the cable is excessively bent during installation of the cable. If the elongation rate of the insulation layer 20 is greater than 250%, the heat resistance of the insulation layer 20 may be decreased to a large extent.

In detail, the electrically insulating polymer resin may include first polyolefin resin having a melting point Tm of 90 to 170° C., and second polyolefin resin having a melting point Tm of 50 to 80° C., preferably, 50 to 70° C., and more preferably, 50 to 65° C. Preferably, the difference between the melting points of the first polyolefin resin and the second polyolefin resin may be 20° C. or more. A ratio of weights of the first polyolefin resin and the second polyolefin resin may be 2:8 or 6:4.

When the melting point Tm of the first polyolefin resin exceeds 170° C., the melting point Tm of the second polyolefin resin exceeds 80° C., or the ratio of the weights of the first polyolefin resin and the second polyolefin resin is greater than 6:4, compatibility of the resin with a filler such as the flame-retardant agent, i.e., the dispensability of the filler such as the flame-retardant agent with respect to the resin, may be greatly deceased and thus the elongation rate of the insulation layer 120 may be greatly decreased. Thus, the insulation layer 20 may have surface cracks or be damaged when the cable is excessively bent during installation of the cable. Furthermore, the physical properties of the insulation layer 20 may be decreased due to bubbles generated in the insulation layer 20 when the viscosity of the insulation composition increases due to addition of an inorganic filler such as the flame-retardant agent and extrusion load increases due to the increase in the viscosity of the insulation composition when the insulation layer 20 is extruded. When extrusion linear velocity is decreased to lower the extrusion load, the yield may decrease and thus manufacturing costs of the cable may increase.

In contrast, when the melting point Tm of the first polyolefin resin is less than 90° C., the melting point Tm of the second polyolefin resin is less than 50° C., or the ratio between the weights of the first polyolefin resin and the second polyolefin resin is less than 2:8, the elastic coefficient of the insulation layer 20 may decrease and the flexibility of the insulation cable may be excessive. As a result, installation performance may greatly decrease and thus wires may stick together when the insulation layer 20 is cross-linked in a steam chamber or the like.

For example, the first polyolefin resin may be polyolefin resin such as polyethylene or polypropylene, preferably, polyethylene, and more preferably, low-density polyethylene. The polyethylene may be a homopolymer, a random or block copolymer with α-olefin such as ethylene and propylene, 1-butene, 1-pentene, 1-hexene, or 1-octene, or a combination thereof.

In addition to polyethylene, the second polyolefin resin may further include polyolefin elastomer (POE) such as propylene-ethylene rubber (EPR) or propylene-ethylene diene rubber (EPDM), styrene butadiene rubber (SBR) such as a styrene-ethylene butane-styrene copolymer, a styrene-ethylene propylene-styrene copolymer, a styrene-ethylene-ethylene propylene-styrene copolymer, or a styrene-butylene-styrene copolymer, ethylene vinyl acetate (EVA) (in which vinyl acetate content is about 15 to 40 weight %), ethylene methyl acrylate (EMA), ethylene ethyl acrylate (EEA), ethylene butyl acrylate (EBA), and preferably, polyolefin elastomer (POE).

Polyolefin elastomer, styrene butadiene rubber (SBR), ethylene vinyl acetate (EVA), or the like (hereinafter referred to be 'polyolefin elastomer or the like') may additionally improve the flexibility, bendability, impact resistance, cold resistance, heat resistance, etc. of the insulation layer 20 formed of the insulation composition.

The electrically insulating polymer resin may include not only the two types of resin but also modified polyolefin resin, e.g., modified linear low-density polyethylene resin (LLDPE), and preferably, linear low-density polyethylene resin (LLDPE) grafted with maleic anhydride. The modified polyolefin resin may additionally improve compatibility between the resin and an inorganic filler such as the flame-retardant agent, has a high degree of crystallinity and may thus additionally improve mechanical properties such as tensile strength of the insulation layer 20 since it has a melting point of 100 to 120° C., and may additionally improve the appearance, elongation rate, heat resistance, etc. of the insulation layer 20.

The modified polyolefin resin may increase extrusion load during extruding of the insulation composition owing to the low melting point of the second polyolefin resin as described above and through control of a mixing ratio of different types of resin.

Here, when the electrically insulating polymer resin includes the modified linear low-density polyethylene resin (LLDPE), the content of the modified linear low-density polyethylene resin (LLDPE) may be 5 to 20 parts by weight with respect to 100 parts by weight of the electrical insulating polymer resin.

The halogen-free flame-retardant polyolefin insulation composition according to the present invention may include, for example, a metal hydroxide flame-retardant agent such as magnesium hydroxide (Mg(OH)$_2$) or aluminum hydroxide (Al(OH)$_3$). The halogen-free flame-retardant polyolefin insulation composition may include the flame-retardant agent but also a melamine-based flame-retardant supplement, such as melamine cyanurate, to compensate for a decrease in flame resistance when content of the flame-retardant agent is reduced to solve problems, such as an increase in the viscosity of the composition and an increase in extrusion load during extruding of the insulation layer 20, caused by the addition of an organic filler which will be describe below to reduce manufacturing costs. The halogen-free flame-retardant polyolefin insulation composition may further include a flame-retardant supplement such as nanoclay, a phosphor-based flame-retardant agent such as red phosphorus, or the like.

However, melamine cyanurate serving as the flame-retardant supplement may decompose and generate bubbles in the insulation layer 20 when extrusion load increases due to the addition of the flame-retardant agent, the inorganic filler which will be described below, or the like during extruding of the insulation composition, thereby deteriorating the physical properties of the insulation layer 20. Thus, in order to minimize the generation of the bubbles due to the decomposition of melamine cyanurate serving as the flame-retardant supplement, the viscosity of the insulation composition may be decreased and compatibility of the base resin of the insulation composition with an additive such as the flame-retardant agent or the inorganic filler may be improved through a combination of base resins as described above.

The insulation composition may additionally include an inorganic filler, such as calcium carbonate ($CaCO_3$), which is also an inorganic additive like the flame-retardant agent, as well as the flame-retardant agent. The content of resin contained in the insulation composition may be decreased owing to the addition of the inorganic filler, thereby reducing manufacturing costs of the insulation composition. The organic filler of 10 to 50 parts by weight with respect to 100 parts by weight of the base resin may be added. When the content of the inorganic filler is less than 10 parts by weight, an effect achieved by the addition of the inorganic filler is low. When the content of the inorganic filler is greater than 50 parts by weight, an elongation rate of the insulation layer 20 formed of the insulation composition is very low and extrusion load increases during extruding of the insulation layer 20. Thus, bubbles may be generated in the insulation layer 20 due to the decomposition of the flame-retardant supplement. When the content of the flame-retardant agent is decreased to solve the problems, flame resistance may be lowered to a large extent.

Generally, an inorganic additive, such as magnesium hydroxide, serving as the flame-retardant agent has a hydrophilic property of high surface energy, whereas base resin such as polyolefin has a hydrophobic property of low surface energy. The inorganic additive may have low dispersibility with respect to the base resin and have bad influence on electrical characteristics. Thus, in order to solve this problem, an inorganic additive, such as the flame-retardant agent, may be surface-treated with vinyl silane, metacrylic silane, stearic acid, oleic acid, aminopolysiloxane, a titanate-based coupling agent, or the like.

When the inorganic additive is surface-treated with vinylsilane or the like, a hydrolyzable group such as vinylsilane is chemically bound to a surface of an inorganic particle of magnesium hydroxide or the like through a condensation reaction and a silane group reacts with the base resin, thereby securing high dispersibility.

The content of the flame-retardant agent may be determined to achieve sufficient flame resistance of the insulation composition, for example, flame resistance satisfying the standard KS C 60332-1. For example, the content of the flame-retardant agent may be about 100 to 200 parts by weight, and preferably, 140 to 180 parts by weight with respect to 100 parts by weight of the base resin. When the content of the flame-retardant agent is less than about 100 parts by weight, the flame resistance of the insulation composition may be insufficient. When the content of the flame-retardant agent is greater than about 200 parts by weight, the formability, e.g., flexibility, extendibility, extrudability, etc., of the insulation composition may be low.

The content of the flame-retardant supplement such as melamine cyanurate may be about 10 to 50 parts by weight with respect to 100 parts by weight of the base resin. When the content of the flame-retardant supplement is less than about 10 parts by weight, flame resistance may be insufficient. When the content of the flame-retardant supplement is greater than about 50 parts by weight, the flame-retardant supplement may be harmful to a human body due to the toxicity of melamine cyanurate, and the formability, e.g., flexibility, extendibility, extrudability, etc., of the insulation composition may be decreased. Furthermore, the physical properties of the insulation layer may deteriorate to a large extent since the flame-retardant supplement may decompose and generate bubbles due to an increase in extrusion load during extruding of the insulation composition.

Furthermore, the content of nanoclay serving as the flame-retardant supplement may be 1 to 10 parts by weight and the content of red phosphorus may be 0.5 to 5 parts by weight with respect to 100 parts by weight of the base resin.

In particular, the total content of the flame-retardant agent and the inorganic filler serving as inorganic additives may be 110 to 230 parts by weight with respect to 100 parts by weight of the base resin. When the total content of the inorganic additives is less than 110 parts by weight, the flame resistance of the insulation layer 20 may be insufficient. When the total content of the inorganic additives is greater than 230 parts by weight, the physical properties of the insulation layer 20 may be decreased due to bubbles generated as the flame-retardant supplement such as melamine cyanurate decomposes due to excessive extrusion load during extruding of the insulation composition. When extrusion linear velocity is reduced to suppress the generation of the bubbles, the yield may decrease and manufacturing costs of the cable may increase.

The amount of the flame-retardant agent serving as an inorganic additive may be three to six times greater than that of the inorganic filler. When the amount of the flame-retardant agent is three times less than that of the inorganic filler, the flame resistance of the insulation composition may be insufficient. When the amount of the flame-retardant agent is six times greater than that of the inorganic filler, an excessive amount of the flame-retardant agent is used and thus the formability, e.g., flexibility, extendability, extrudability, etc., of the insulation composition may be low.

The halogen-free flame-retardant polyolefin insulation composition according to the present invention may include a cross-linking agent and thus the insulation layer 20 may be formed of cross-linking polyolefin (XLPO). A method of cross-linking cross-linking polyolefin (XLPO) to form the insulation layer 20 is not limited. For example, a chemical cross-linking method of continuously cross-linking polyolefin in a high-temperature and high-pressure steam line for a short time simultaneously with extrusion molding of the insulation layer 20, a silane cross-linking method of cross-linking polyolefin for a long time at a low temperature and under normal pressure after extrusion molding of the insulation layer 20, a radiation cross-linking method of cross-linking polyolefin through additional electron radiation after extrusion molding of the insulation layer 20, etc. may be used.

Here, the cross-linking agent may be a silane-based cross-linking agent, such as vinyl trimethoxy silane, 3-(trimethoxysilyl)-propylmethacrylate, or an organic peroxide-based cross-linking agent, such as vinyl triethoxysilane, vinyl trimethoxyethoxysilane, or dicumyl peroxide, benzoyl peroxide, laurylperoxide, t-butylcumylperoxide, di(t-butyl peroxy isopropyl) benzene, 2,5-dimethyl-2,5-di(t- butyl peroxy)hexane, or di-t-butyl peroxide, according to a method of cross-linking the polyolefin. When polyolefin is cross-linked according to the silane cross-liking method, a silane-based cross-linking agent may be included as the cross-linking agent and organic peroxide such as dicumyl peroxide may be additionally included as a cross-linking initiator.

In particular, when the cross-linking agent is a silane-based cross-linking agent such as vinyl trimethoxy silane, the base resin may react with the cross-linking agent and be thus grafted with vinylsilane, and may be cross-linked as it is in contact with or is exposed to moisture under the influence of a condensed catalyst. Thus, the insulation composition may further include a condensed catalyst appropriate for cross-linking the base resin.

The condensed catalyst may include metal carboxylate such as dibutyltin dilaurate, tin octoate, tin acetate, lead naphthenate, or zinc octoate, an organic metal compound such as titanium ester, ester and chelate, an organic base such as tetrabutyl titanate, or ethylamine, hexylamine, or piperidine, or acid such as mineral acid or fatty acid. The content of the condensed catalyst may be 0.5 to 5 parts by weight with respect to 100 parts by weight of the base resin.

The content of the cross-linking agent may be selected such that a gel fraction is in a range of 50 to 95% after the base resin is cross-linked. When the gel fraction is less than 50% after the cross-linking of the base resin, a degree of cross-linking may be insufficient and thus heat resistance, tensile strength, and an elongation rate or the like of the insulation composition may be insufficient. When the gel fraction is greater than 95% after the cross-linking of the base resin, the degree of cross-linking may be excessive and thus scorching may occur due to premature cross-linking during extruding of the insulation composition. The content of the cross-linking agent may be, for example, 2.0 to 5.0 parts by weight with respect to 100 parts by weight of the base resin. When the cross-linking agent is a silane-based cross-linking agent such as vinyl trimethoxy silane, the content of dicumyl peroxide serving as a cross-linking initiator may be 0.4 to 5 parts by weight.

In an insulation composition applied to an insulation layer of a halogen-free flame-retardant polyolefin insulation cable according to the related art, for silane cross-linking of base resin, a two-step process of grafting the base resin with a silane functional group according to a silane-based cross-linking agent such as vinyl trimethoxy silane and compounding it with another additive, e.g., a flame-retardant agent. Thus, the yield is low and manufacturing equipment is complicated. However, in the halogen-free flame-retardant polyolefin insulation cable according to the present invention, the content of the cross-linking agent such as vinyl trimethoxy silane is precisely controlled and added and a compounding condition is precisely controlled. Thus, even when grafting the base resin with a silane functional group and compounding the base resin with another additive such as a flame-retardant agent are performed in a one-step process, a desired and sufficient degree of cross-linking may be achieved. Furthermore, the yield may be improved and manufacturing equipment may be simplified owing to the one-step process, thereby reducing manufacturing costs.

The halogen-free flame-retardant polyolefin insulation composition according to the present invention may further include other additives such as an antioxidant, internal lubricant, a processing stabilizer, a heavy-metal deactivator, a blowing agent, and a multifunctional monomer. Here, the content of the antioxidant may be 0.1 to 2 parts by weight with respect to 100 parts by weight of the base resin. The content of the internal lubricant such as liquid silicon or polyethylene-based wax may be 1 to 10 parts by weight, and preferably, 1 to 4 parts by weight with respect to 100 parts by weight of the base resin.

In particular, use of the internal lubricant may additionally solve problems, e.g., an increase in extrusion load during extruding of the insulation composition due to the addition of the flame-retardant agent, the inorganic filler, etc. as the inorganic additives, and a decrease in the yield due to a decrease in the extrudability of the insulation layer 20, other physical properties, or linear extrusion velocity, caused by the increase in the extrusion load.

In the halogen-free flame-retardant polyolefin insulation cable according to the present invention, an insulation composition used to form the insulation layer 20 or the outer insulation layer 30 may additionally include external lubricant and pigment. Alternatively, an insulation composition used to form the outer insulation layer 30 may not include the flame-retardant supplement such as melamine cyanurate and the inorganic filler such as calcium carbonate, unlike that used to form the insulation layer 20, since the flame-retardant supplement may spoil the appearance of the outer insulation layer 30 and the inorganic filler may further aggravate the appearance of the outer insulation layer 30.

In detail, as illustrated in FIG. 1A, when the halogen-free flame-retardant polyolefin insulation cable according to the present invention includes only the insulation layer 20 and does not additionally include the outer insulation layer 30, the lubricant and/or the pigment may be included to a specific thickness, e.g., a thickness of 30 to 500 μm, on a surface of the insulation layer 20.

As illustrated in FIG. 1B, when the halogen-free flame-retardant polyolefin insulation cable according to the present invention includes an insulation layer 20 and an additional outer insulation layer 30 provided on an outer surface of the insulation layer 20, the outer insulation layer 30 may include the lubricant and/or the pigment.

Since external lubricant for improving installation performance of the cable including the insulation layer 20 and the outer insulation layer 30 by decreasing a friction coefficient of the insulation layer 20 or the outer insulation layer 30 formed of the insulation composition, pigment for giving desired colors to the insulation layer 20 and the outer insulation layer 30, and other additives are generally in a power state or a liquid state, it may be difficult to directly mix them with base resin which is an element of the insulation composition. Furthermore, it may be difficult to achieve a desired function, color, or the like due to a dispersion error occurring in the base resin.

Accordingly, in order to solve this problem, a masterbatch which is a material obtained in a pellet form by using, as a main material of a vehicle, resin which is the same as or different from the base resin to be mixed and concentrating and dispersing the external lubricant, the pigment, the additives, and the like in high concentration in the resin may be used.

Examples of the external lubricant may include fatty acid, fatty acid salt, fatty acid amide, silicon-based lubricant, wax, etc. The external lubricant may decrease a surface friction coefficient of the insulation layer 20 or the outer insulation layer 30, and additionally increase an elongation rate to avoid or minimize damage to the insulation layer 20 or the outer insulation layer 30 at a curved region of the cable when the cable is bent. Furthermore, generally, the external lubricant has a hydrophobic property and thus may additionally suppress dielectric breakdown caused when the halogen-free flame-retardant polyolefin insulation cable is flooded.

The external lubricant may be added in a masterbatch form or directly to the insulation composition used to form the insulation layer 20 or the outer insulation layer 30. When the external lubricant is added in the masterbatch form, the external lubricant of 40 to 60 weight % with respect to a total weight of the masterbatch may be included in the masterbatch. The content of the external lubricant may be 1 to 10 parts by weight, and preferably, 1 to 5 parts by weight with respect to 100 parts by weight of the base resin of the insulation composition used to form the insulation layer 20 or the outer insulation layer 30.

When the content of the external lubricant is less than 1 part by weight, the surface friction coefficient of the insulation layer 20 or the outer insulation layer 30 cannot be decreased sufficiently. When the content of the external lubricant is greater than 10 parts by weight, the unit price of the cable may be decreased but a friction force is excessively decreased and thus the cable may have non-uniform external diameters during extruding of an insulation layer 20.

When the pigment is included in a masterbatch form, a pigment masterbatch (CMB) may have a shape similar to a pellet, a plate, a flake, or the like and the concentration of the pigment excluding the pigment may be 20 to 70 weight % with respect to the total weight of the pigment masterbatch.

The content of the pigment may be 1 to 10 parts by weight, and preferably, 1 to 5 parts by weight with respect to 100 parts by weight of the base resin of the insulation composition used to form the insulation layer 20 or the outer insulation layer 30. When the content of the pigment is less than 1 part by weight, a desired color of the insulation layer 20 or the outer insulation layer 30 may be difficult to achieve. When the content of the pigment is greater than 10 parts by weight, the flame resistance of the cable may be low.

In the halogen-free flame-retardant polyolefin insulation cable according to the present invention, the external lubricant and the pigment are included in a region having a specific thickness on a surface of the insulation layer 20 when only the insulation layer 20 is included, and are included in the outer insulation layer 30 when both the insulation layer 20 and the outer insulation layer 30 are included. Thus, an extraordinary and unpredictable effect of remarkably decreasing a surface friction coefficient of the insulation layer 20 or the outer insulation layer 30 may be achieved. As a result, the installation performance of the halogen-free flame-retardant polyolefin insulation cable may be greatly improved. A decrease in the physical properties, e.g., flame resistance, of the cable may be minimized by minimizing the content of the pigment for achieving a desired color of the cable.

When the halogen-free flame-retardant polyolefin insulation cable according to the present invention has a two-layer structure including the insulation layer 20 and the outer insulation layer 30, a total thickness of the insulation layer 20 and the outer insulation layer 30 may vary according to a size of a conductor of the halogen-free flame-retardant polyolefin insulation cable. For example, the total thickness of the insulation layer 20 and the outer insulation layer 30 may be about 0.7 to 1.0 mm. In this case, the outer insulation layer 30 may have a thickness of about 30 to 500 μm.

According to the present invention, when an actual thickness of the external lubricant and the pigment included in the insulation layer 20 or the thickness of the outer insulation layer 30 is less than about 50 μm, a color of the insulation layer 20 may be reflected and a large amount of the pigment should be added to achieve the desired color of the insulation layer 20. In this case, flame resistance of the halogen-free flame-retardant polyolefin insulation cable may be low. Similarly, when the actual thickness of the external lubricant and the pigment included in the insulation layer 20 or the thickness of the outer insulation layer 30 is greater than about 500 μm, large amounts of external lubricant and pigment should be added to achieve the desired color and physical property of the insulation layer 20. Thus, the physical properties of the halogen-free flame-retardant polyolefin insulation cable may deteriorate.

In the halogen-free flame-retardant polyolefin insulation cable according to the present invention, the insulation composition used to form the outer insulation layer 30 provided on the outer surface of the insulation layer 20 may include base resin, a flame-retardant agent, a cross-linking agent, and other additives which are the same as those of the insulation composition of the insulation layer 20, and be cross-linked according to a method of cross-linking the insulation layer 20 so as to increase the adhesion between the insulation layer 20 and the outer insulation layer 30 and simplify a manufacturing process.

Figure 2A:
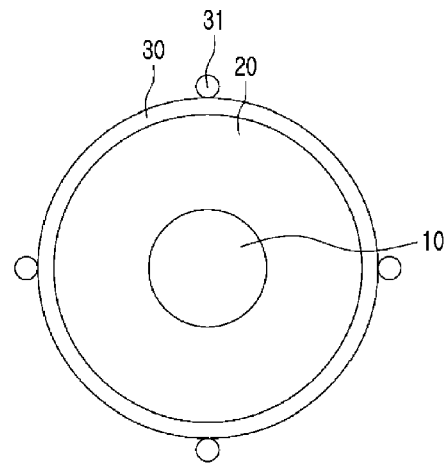
FIGS. 2A-2C are schematic cross-sectional views of halogen-free flame-retardant polyolefin insulation cables according to embodiments of the present invention.
Figure 2B:
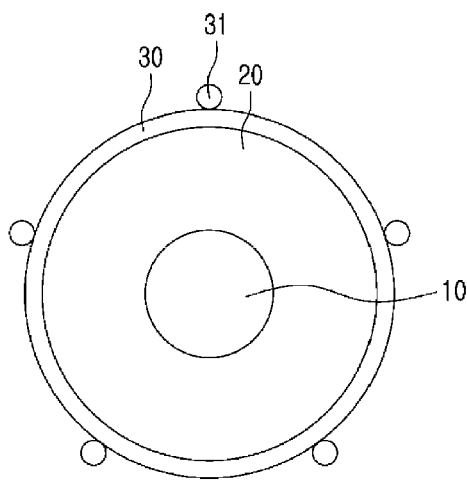
Figure 2C:
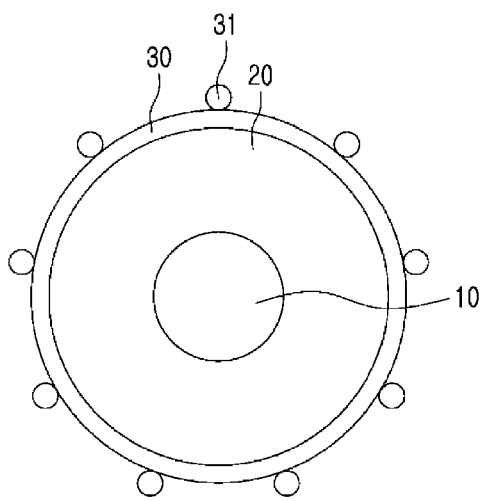

FIGS. 2A-2C are schematic cross-sectional views of halogen-free flame-retardant polyolefin insulation cables according to embodiments of the present invention. As illustrated in FIGS. 2A-2C, an insulation layer 20 or an outer insulation layer 30 of the halogen-free flame-retardant polyolefin insulation cable according to the present invention may include at least one protrusion 31. The at least one protrusion 31 may change surface contact between the insulation layer 20 or the outer insulation layer 30 and an inner wall of a PVC conduit tube to line contact during installation of the cable, thereby additionally improving the installation performance of the halogen-free flame-retardant polyolefin insulation cable.

The number of the at least one protrusion 31 may be four as illustrated in FIG. 2A, may be five as illustrated in FIG. 2B, or may be nine as illustrated in FIG. 2C. The number and arrangement of the at least one protrusion 31 may be appropriately selected by those of ordinary skill in the art on the basis of a size of the halogen-free flame-retardant polyolefin insulation cable according to the present invention, working conditions during the installation of the cable, and the like.

Figure 3A:
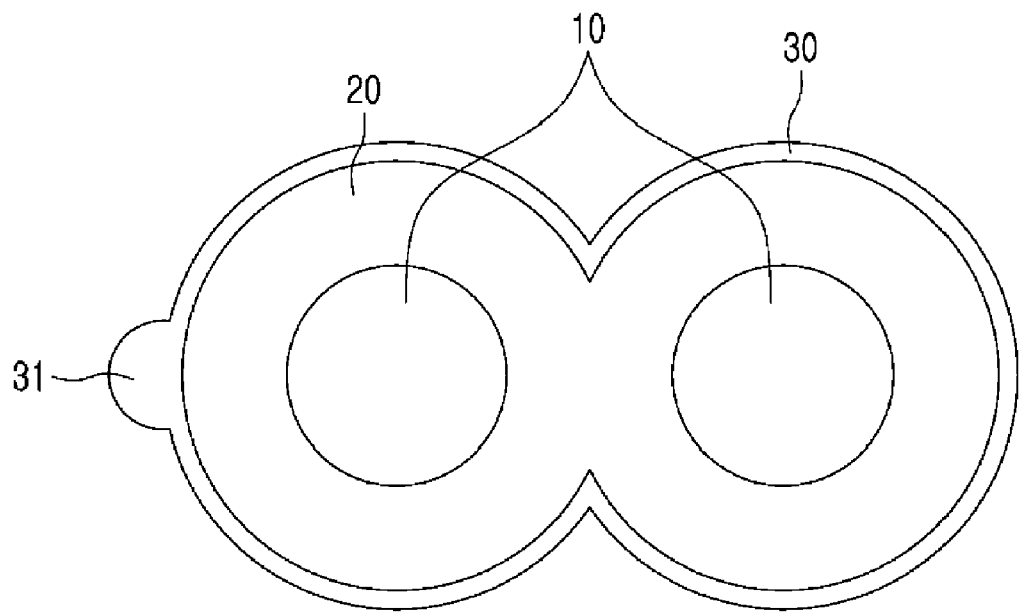
FIGS. 3A and 3B are schematic cross-sectional views of halogen-free flame-retardant polyolefin insulation cables according to embodiments of the present invention.
Figure 3B:
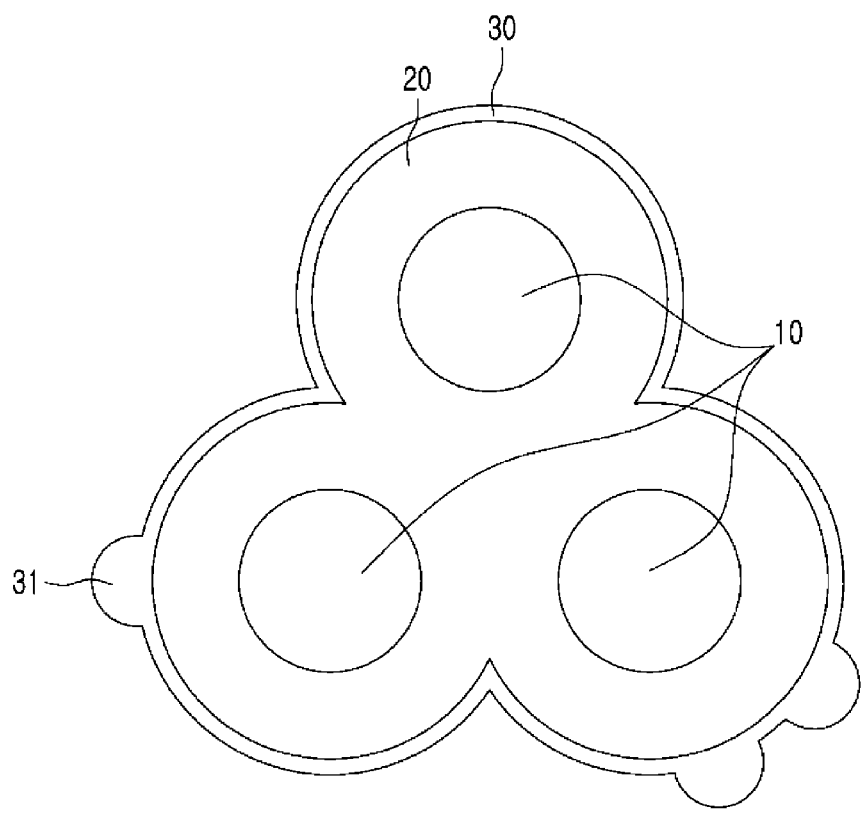

FIGS. 3A and 3B are schematic cross-sectional views of halogen-free flame-retardant polyolefin insulation cables according to embodiments of the present invention. As illustrated in FIGS. 3A and 3B, in the halogen-free flame-retardant polyolefin insulation cable according to the present invention, a plurality of conductors, e.g., two or three conductors, may be extruded simultaneously to integrally form an insulation layer thereof. In this case, when a plurality of cables are installed together, installation performance may be prevented from being decreased when adjacent cables are rubbed against each other. Furthermore, at least one protrusion 31 may be provided on the integrally formed insulation layer 20 or outer insulation layer 30 to change surface contact between the halogen-free flame-retardant polyolefin insulation cable and an inner wall of a PVC conduit tube to line contact, thereby additionally improving the installation performance of the halogen-free flame-retardant polyolefin insulation cable.

Figure 4:
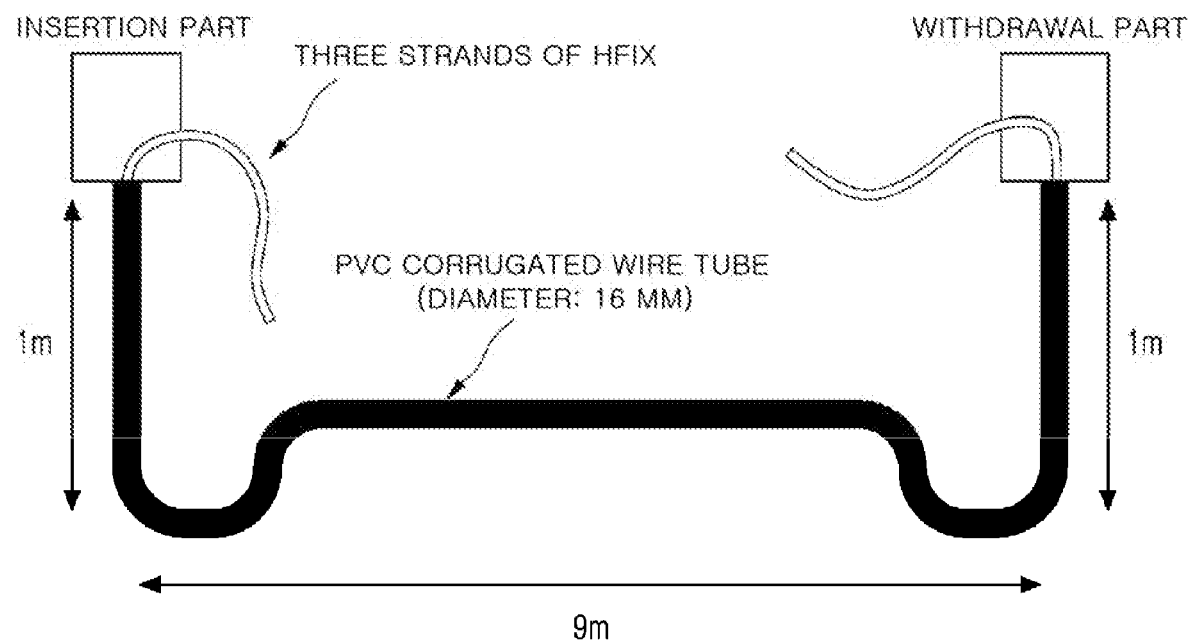
FIG. 4 is a diagram schematically illustrating a virtual installation work environment for evaluating a halogen-free flame-retardant polyolefin insulation cable according to the present invention.

FIG. 4 is a diagram schematically illustrating a virtual installation work environment for evaluating a halogen-free flame-retardant polyolefin insulation cable according to the present invention. As illustrated in FIG. 4, the virtual installation work environment includes a PVC corrugated tube which has six curved parts having round corners and curved at right angles and which has a vertical length of 1 m, a horizontal length of 9 m and an internal diameter of 16 mm according to the shape of the curved parts. The installation performance of the halogen-free flame-retardant polyolefin insulation cable may be evaluated by pulling three strands of a halogen-free flame-retardant polyolefin insulation cable sample, which is inserted into the PVC corrugated tube, using a push-pull gauge at 45° upward in a direction perpendicular to one lower end of the PVC corrugated tube, repeatedly measuring a tensile force required to pull out the sample five times, and calculating an average value of the measured tensile forces. The tensile force may be preferably 10 kgf or less, and more preferably, 5 kgf or less.

EXAMPLES

1. Preparation Examples

Insulation compositions according to examples were prepared according to ingredients and mixing ratios shown in table 1 below. In detail, the insulation compositions were prepared using an internal mixer and inner insulation layers and outer insulation layers according to examples were extruded and cross-linked with each other in a water tank of 50 to 100° C. to manufacture insulation layer samples and a 2.5 SQ halogen-free flame-retardant polyolefin insulation cable sample according to examples. A unit of content shown in table 1 below is parts by weight.

As shown in Table 2 above, both the elongation rate of the halogen-free flame-retardant polyolefin insulation cable according to the present invention and heat resistance thereof which is in trade-off relation with the elongation rate were improved and desired values thereof were satisfied.

However, in the case of comparative example 1, excessive content of resin having a melting point of 90° C. or more was

TABLE 1

|  | Comparative example 1 | Example 1 | Example 2 | Example 3 | Example 4 | Example 5 | Example 6 | Comparative example 2 |
|---|---|---|---|---|---|---|---|---|
| Resin 1 | 30 | 30 | 40 | 40 | 40 | 40 | 40 | 40 |
| Resin 2 | 40 | 20 | | | | | | |
| Resin 3 | | | 60 | | | | | |
| Resin 4 | | | | 60 | | | | |
| Resin 5 | | | | | 60 | | | |
| Resin 6 | 30 | 50 | | | | 60 | | |
| Resin 7 | | | | | | | 60 | |
| Resin 8 | | | | | | | | 60 |
| Flame-Retardant agent | 160 | 160 | 160 | 160 | 160 | 160 | 160 | 160 |
| Crosslinking agent | 2.9 | 2.9 | 2.9 | 2.9 | 2.9 | 2.9 | 2.9 | 2.9 |

Resin 1: low-density polyethylene (melting point: 110° C.)
Resin 2: low-density polyethylene (melting point: 100° C.)
Resin 3: polyolefin elastomer (melting point: 77° C.)
Resin 4: polyolefin elastomer (melting point: 74° C.)
Resin 5: polyolefin elastomer (melting point: 68° C.)
Resin 6: polyolefin elastomer (melting point: 66° C.)
Resin 7: polyolefin elastomer (melting point: 60° C.)
Resin 8: polyolefin elastomer (melting point: 38° C.)
flame-retardant agent: silane-coated magnesium hydroxide
cross-linking agent: vinyl trimethoxy silane 2. Evaluation of Physical Properties The physical properties of tubular insulating samples obtained by removing conductors from the halogen-free flame-retardant polyolefin insulation cable samples according to examples were evaluated as below.

(1) Heat Distortion Evaluation

Heat distortion characteristics were evaluated according to the standard KS C 60811-2-1 by attaching a weight having a certain weight to tubular insulating samples according to examples each having a length of about 70 mm long in an oven of about 200° C. and measuring a rate of increase in the length of these samples after fifteen minutes. Here, a degree of heat distortion should be 50% or less.

(2) Evaluation of Room-temperature Elongation Rates

Room-temperature elongation rates were evaluated according to the standard KS C 60811-1-1 by applying a tensile force to tubular insulating samples according to examples each having a length of about 100 mm long at 23±5° C. and a tension speed of 250 mm/min and measuring a rate of increase in the length of the tubular insulating samples when these samples fractured. Here, the room-temperature elongation rate should be 125% or more.

A result of evaluating room-temperature elongation rates is as shown in table 2 below.

included in an insulation layer and thus an elongation rate was very low. In contrast, in the case of comparative example 2, resin having a melting point of less than 50° C. was included in an insulation layer and heat distortion characteristics were lowered to a large extent.

Although exemplary embodiments of the present invention are described in the present disclosure, it would be apparent to those of ordinary skill in the art that the present invention may be embodied in many different forms without departing from the idea and scope of the invention as defined in the appended claims. Therefore, the scope of the invention should be defined by the appended claims, and all differences within the scope will be construed as being included in the present invention.

The invention claimed is:

1. A halogen-free flame-retardant insulation composition for a silane cross-linked insulation layer of a cable used for interior wiring and transferred through a conduit tube, comprising:
    halogen-free resin serving as base resin;
    a flame-retardant agent,
    a flame-retardant supplement;
    an inorganic filler; and

TABLE 2

|  | Comparative example 1 | Example 1 | Example 2 | Example 3 | example 4 | Example 5 | Example 6 | Comparative example 1 |
|---|---|---|---|---|---|---|---|---|
| Elongation rate (%) | 115 | 130 | 130 | 193 | 175 | 152 | 177 | 260 |
| Distortion by heat (%) | 17 | 19 | 23 | 28 | 14 | 26 | 33 | 53 | at least one type of a silane-based cross-linking agent selected from a group consisting of vinyl trimethoxy silane, 3-(trimethoxysilyl)-propylmethacrylate, vinyl triethoxy silane, and vinyl trimethoxyethoxy silane,
wherein the halogen-free resin comprises:
first polyolefin resin having a melting point of 90 to 170° C.; and
second polyolefin resin having a melting point of 50 to 80° C.,
wherein the inorganic filler comprises calcium carbonate (CaCO3),
wherein a mixing ratio of the first polyolefin resin and the second polyolefin resin is 2:8 to 6:4,
wherein content of the flame-retardant agent is 100 to 200 parts by weight with respect to 100 parts by weight of the base resin,
wherein total content of inorganic additives including the flame-retardant agent and the inorganic filler is 110 to 230 parts by weight with respect to 100 parts by weight of the base resin,
wherein content of the inorganic filler is 10 to 50 parts by weight with respect to 100 parts by weight of the base resin,
wherein an amount of the flame-retardant agent is three to six times greater than that of the inorganic filler,
wherein an amount of the silane based cross-linking agent is 2.0 to 5.0 parts by weight with respect to 100 parts by weight of the base resin, wherein a gel fraction of the insulation composition is in a range of 50 to 95% after halogen-free resin of the insulation composition is crosslinked, and
wherein an insulating sample formed of the insulation composition has an elongation rate of 125% or more.

2. The halogen-free flame-retardant insulation composition for a silane cross-linked insulation layer of a cable used for interior wiring and transferred through a conduit tube of claim 1, wherein content of the flame-retardant supplement is 10 to 50 parts by weight with respect to 100 parts by weight of the base resin.

3. The halogen-free flame-retardant insulation composition for a silane cross-linked insulation layer of a cable used for interior wiring and transferred through a conduit tube of claim 1, wherein a difference between the melting points of the first polyolefin resin and the second polyolefin resin is 20° C. or more.

4. The halogen-free flame-retardant insulation composition for a silane cross-linked insulation layer of a cable used for interior wiring and transferred through a conduit tube of claim 1, wherein the insulating sample formed of the insulation composition has an elongation rate of 125% to 250%.

5. The halogen-free flame-retardant insulation composition for a silane cross-linked insulation layer of a cable used for interior wiring and transferred through a conduit tube of claim 1, wherein a heat distortion rate of a tubular insulating sample formed of the insulation composition and having a length of 70 mm is measured to be 50% or less according to a standard KS C 60811-2-1, the heat distortion rate being a rate of increase in the length of the tubular insulation sample, measured by attaching a weight having a certain weight to the tubular insulating sample in an oven of 200° C. and measuring the rate of increase in the length of the sample after fifteen minutes.

6. The halogen-free flame-retardant insulation composition for a silane cross-linked insulation layer of a cable used for interior wiring and transferred through a conduit tube of claim 1, wherein the first polyolefin resin comprises low-density polyethylene resin, and
the second polyolefin resin comprises polyolefin elastomer.

7. The halogen-free flame-retardant insulation composition for a silane cross-linked insulation layer of a cable used for interior wiring and transferred through a conduit tube of claim 1, wherein the halogen-free resin further comprises a modified polyolefin resin, and the modified polyolefin resin comprises modified linear low-density polyethylene resin (LLDPE) of 5 to 20 parts by weight with respect to 100 parts by weight of the base resin.

8. The halogen-free flame-retardant insulation composition for a silane cross-linked insulation layer of a cable used for interior wiring and transferred through a conduit tube of claim 7, wherein the modified linear low-density polyethylene resin (LLDPE) comprises linear low-density polyethylene resin (MA-g-LLDPE) grafted with maleic anhydride.

9. The halogen-free flame-retardant insulation composition for a silane cross-linked insulation layer of a cable used for interior wiring and transferred through a conduit tube of claim 1, further comprising internal lubricant of 1 to 10 parts by weight with respect to 100 parts by weight of the base resin.

10. The halogen-free flame-retardant insulation composition for a silane cross-linked insulation layer of a cable used for interior wiring and transferred through a conduit tube of claim 9, wherein the internal lubricant comprises polyethylene-based wax of 1 to 4 parts by weight with respect to 100 parts by weight of the base resin.

11. The halogen-free flame-retardant insulation composition for a silane cross-linked insulation layer of a cable used for interior wiring and transferred through a conduit tube of claim 1, wherein the flame-retardant agent comprises magnesium hydroxide (Mg(OH)$_2$) or aluminum hydroxide (Al(OH)$_3$) which is surface-treated with at least one type of a surface modifier selected from a group consisting of vinylsilane, metacrylic silane, stearic acid, oleic acid, aminopolysiloxane, and a titanate-based coupling agent.

12. A halogen-free flame-retardant insulation cable used for interior wiring and transferred through a conduit tube, comprising:
a conductor; and
a silane cross-linked insulation layer covering the conductor, and formed of the halogen-free flame-retardant insulation composition of claim 1.

13. The halogen-free flame-retardant insulation cable used for interior wiring and transferred through a conduit tube of claim 12, wherein the halogen-free flame-retardant insulation composition further comprises:
a flame-retardant supplement; and
an inorganic filler.

14. The halogen-free flame-retardant insulation cable used for interior wiring and transferred through a conduit tube of claim 12, further comprising an outer insulation layer covering the insulation layer,
wherein the outer insulation layer is formed of the halogen-free flame-retardant insulation composition of claim 1,
wherein the outer insulation layer has a thickness of 30 to 500 μm, and comprises external lubricant.

* * * * *